United States Patent
Denton et al.

(10) Patent No.: US 8,301,288 B2
(45) Date of Patent: Oct. 30, 2012

(54) OPTIMIZED SCHEDULING BASED ON SENSITIVITY DATA

(75) Inventors: Brian T. Denton, Winooski, VT (US);
Cuc K Huynh, Jericho, VT (US);
Shreesh S. Tandel, South Burlington, VT (US); Steven H. Voldman, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1838 days.

(21) Appl. No.: 10/710,065

(22) Filed: Jun. 16, 2004

(65) Prior Publication Data

US 2005/0283265 A1   Dec. 22, 2005

(51) Int. Cl.
*G06F 19/00* (2011.01)
*G05B 13/02* (2006.01)
*H01L 21/00* (2006.01)
*H01L 21/66* (2006.01)

(52) U.S. Cl. .......... 700/100; 700/29; 700/109; 700/112; 700/121; 700/175; 438/10; 438/17

(58) Field of Classification Search .......... 718/100–103; 700/28, 99–103, 105, 108, 109, 112, 97, 700/121, 128, 174, 175, 177, 178, 21, 95; 438/5, 10, 11, 14, 17; 702/40, 81, 84, 182; 324/408, 409, 500, 657, 719; 250/586; 714/47, 714/48, 100
See application file for complete search history.

(56) References Cited

U.S. PATENT DOCUMENTS

| | | | |
|---|---|---|---|
| 6,351,684 B1 * | 2/2002 | Shirley et al. | 700/121 |
| 6,470,227 B1 * | 10/2002 | Rangachari et al. | 700/95 |
| 6,535,783 B1 * | 3/2003 | Miller et al. | 700/121 |
| 6,711,450 B1 * | 3/2004 | Conboy et al. | 700/115 |
| 6,763,277 B1 * | 7/2004 | Allen et al. | 700/100 |
| 6,842,661 B2 * | 1/2005 | Chong et al. | 700/121 |
| 6,980,873 B2 * | 12/2005 | Shen | 700/108 |
| 7,206,653 B1 * | 4/2007 | Ou et al. | 700/99 |
| 7,209,798 B2 * | 4/2007 | Yamashita et al. | 700/121 |
| 2004/0082083 A1 * | 4/2004 | Kraz et al. | 438/14 |
| 2006/0224272 A1 * | 10/2006 | Li et al. | 700/214 |

* cited by examiner

*Primary Examiner* — Mohammad Ali
*Assistant Examiner* — Jennifer L Norton
(74) *Attorney, Agent, or Firm* — Richard Kotulak; Hoffman Warnick LLC

(57) ABSTRACT

A scheduling optimizer system, method and program product that analyzes a device for sensitivities, such as ESD sensitivities, and allows for modification of a floor schedule of the assembly unit of the device based on the sensitivity of the device while improving the overall performance of the assembly unit are disclosed. The scheduling optimizer analyzes sensitivity data for a device during operation of the assembly unit on the floor schedule. The floor schedule is then optimized based on the analyzed sensitivity data.

34 Claims, 11 Drawing Sheets

OPTIMIZED SCHEDULING BASED ON SENSITIVITY DATA

BACKGROUND OF INVENTION

1. Technical Field

The invention relates generally to an assembly system and more specifically to a scheduling optimizer for a device, such as a semiconductor, assembly system.

2. Related Art

Devices, such as semiconductor components, Cathode-ray tubes, hard drives, and other electronic and non-electronic devices in a manufacturing environment may be sensitive to several different types of activities or events as they are being manufactured. These activities and other factors may produce a failure of the device, especially in the case that the device is an electronic component that may be impaired or destroyed from electrical overstress (EOS), electrostatic discharge (ESD) or latch-up.

EOS, ESD and latch-up are concerns in both internal and peripheral circuitry of a device. Specifically, ESD activities may influence, to name a few, off-chip drivers, ESD networks, transmitter and receiver networks, system clocks, phase lock loops, capacitors, decoupling capacitors and fill shapes. ESD activities may also influence DRAM memory, SRAM memory, gate arrays, and logic circuitry. Latch-up may occur between interactions within a given circuit, or between circuits. Latch-up may also be an inter-circuit or intra-circuit interaction.

Several activities or factors that may cause ESD, EOS or latch-up in electronic components include: the environment through which the device is routed; the shipping of the device; shipping container types; machines used to assemble the device; extent of handling of the device; device design; fabrication technology; device package style; and/or tools used in the manufacturing of the device. Specifically, with environmental conditions, humidity influences the ESD discharge process and the level of potential risk to the device. Dry environments can lead to a higher ESD discharge event, leading to a higher risk to device failure. High humidity leads to a lower ESD discharge event. With shipping of the device, ESD failures may be influenced, for example, by the motion, material properties of the shipping containers and vehicles, and/or the percentage of material, including the devices, within each shipping container. Electromagnetic emissions (EMI) noise can also induce ESD activities during shipping and handling.

Failures may occur at different stages of the manufacturing and assembly of the device prior to the final device development. ESD failures may occur on wafers, diced devices, and packaged and unpackaged components. With automated material handling systems (AMHS), the movement of assembly lots of devices between stocking points, bays, and individual tools may be done without human operators through a floor schedule. But even without human operators, the device may be sensitive to different types of machines or mechanisms with various levels of sensitivity at different points of the assembly of the device.

Currently, there are a variety of industry standard methods that are used for reducing ESD failure rates (e.g., humidity control) in the assembly of a device. Some of these methods may be selectively applied with the assembly of the device. Although these methods may reduce specific ESD sensitivities, other ESD sensitivities may occur with the assembly of the device that may not be noticed until the device or other devices fail. Consequently, modifications to the floor schedule of an assembly unit (e.g., the tools, systems, methods, etc., that are used or available for use in a manufacturing environment to assemble a device, or a group of devices, such as an assembly lot) that could reduce other occurring ESD sensitivities may not be made until many devices have failed, thus, negatively affecting the yield loss of the assembly.

Accordingly, a need has developed in the art for a system and method that analyzes a device for sensitivities, such as ESD sensitivities, and allows for modification of a floor schedule of an assembly unit based on the sensitivity of the device while improving the overall performance of the assembly unit.

SUMMARY OF INVENTION

The present invention provides a scheduling optimizer system, method and program product that analyzes a device for sensitivities, such as ESD sensitivities, and allows for modification of a floor schedule of an assembly unit based on the sensitivity of the device while improving the overall performance of the assembly unit.

Generally, a first aspect of the present invention is directed to a method comprising the steps of: providing a floor schedule of an assembly unit for a device; and optimizing the floor schedule based on sensitivity data during operation of the assembly unit on the floor schedule.

In addition, a second aspect of the present invention provides a computer program product comprising a computer useable medium having computer readable program code embodied therein for optimizing a floor schedule of an assembly unit for a device, the program product comprising: program code configured to analyze sensitivity data for the a device during operation of the assembly unit on the floor schedule; and program code configured to optimize the floor schedule of the assembly unit based on the sensitivity data.

The present invention also provides an optimizer system comprising: a model analyzer for receiving sensitivity data for a device of an assembly unit, and analyzing the sensitivity data during operation of the assembly unit on a floor schedule; and a scheduling optimizer for optimizing the floor schedule of the assembly unit based on the analyzed sensitivity data.

The present invention also provides a method comprising the steps of: generating sensitivity data for a device of an assembly unit during operation of the assembly unit on a floor schedule; and receiving an optimal path data of the floor schedule that is generated based on the sensitivity data, wherein the optimal path data controls the path of the device through the assembly unit.

The present invention also provides a testing unit comprising: a sensitivity monitor for generating sensitivity data for a device; a reliability generator for generating reliability data having rules for the device; and a tool controller for invoking the sensitivity monitor and reliability generator and shutting down a testing tool of the testing unit.

The foregoing and other features of the invention will be apparent from the following more particular description of embodiments of the invention, as illustrated in the accompanying drawings.

BRIEF DESCRIPTION OF DRAWINGS

Embodiments of the present invention will hereinafter be described in conjunction with the appended drawings, where like designations denote like elements, and wherein.

DETAILED DESCRIPTION

For convenience purposes only, the sections below are outlined with the following headings (parentheticals not included): i. Overview of Scheduling Optimizer Environment (FIG. 1); ii. Scheduling Optimizer System (FIGS. 2-7); iii. Assembly Unit with Messaging System (FIGS. 8 and 9); iv. Testing Unit with Messaging System (FIG. 10); v. Scheduling Optimizer with Messaging System (FIG. 11); and vi. Conclusion.

i. Overview of Scheduling Optimizer Environment

Figure 1:
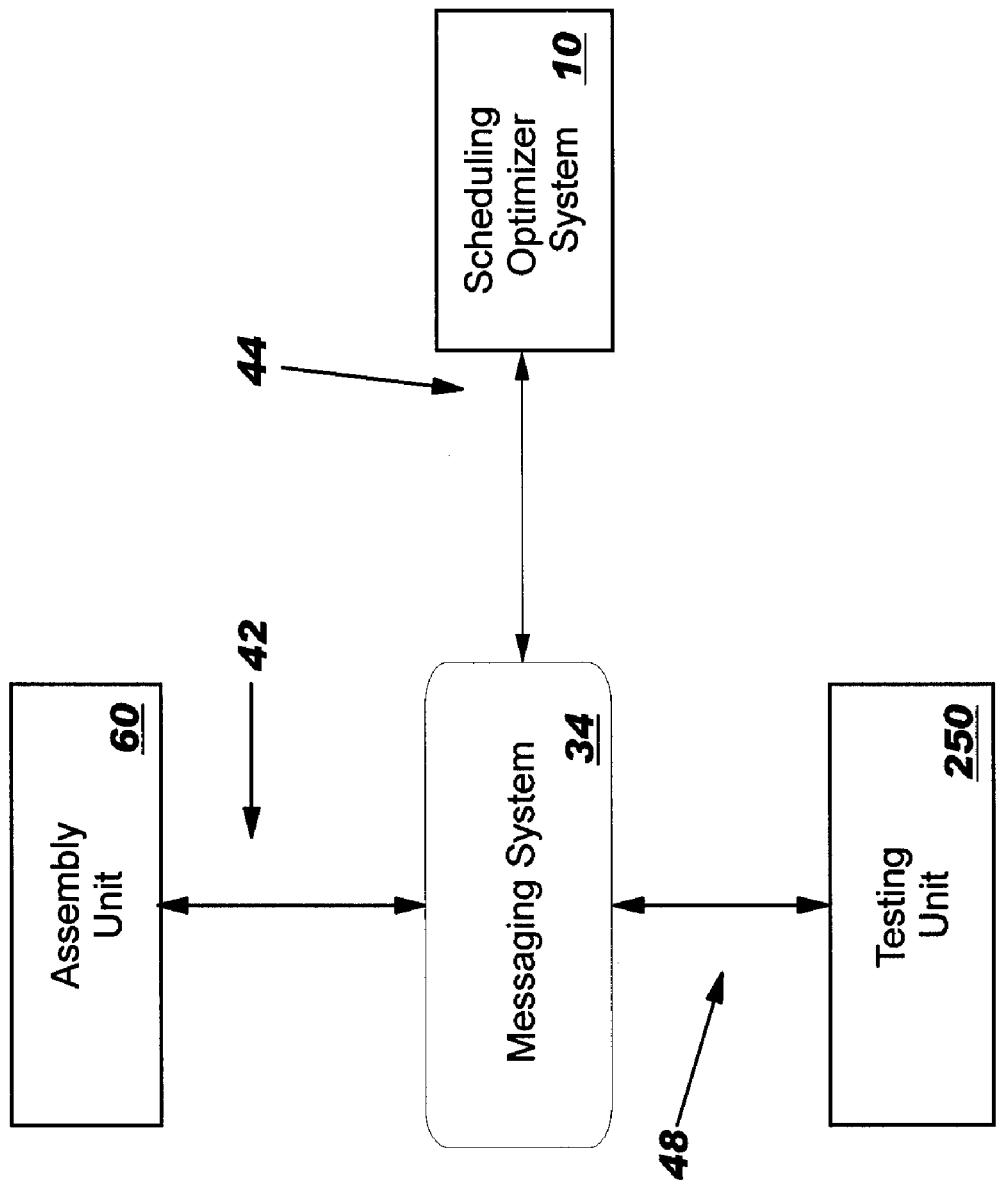
FIG. 1 is a block diagram of an example environment of a scheduling optimizer system in accordance with the present invention.

With reference to the accompanying drawings, FIG. 1 is a block diagram of an example of the environment of a scheduling optimizer system 10 in accordance with the present invention. In this example, the environment of scheduling optimizer system 10 includes an assembly unit 60, a testing unit 250, a messaging system 34 and scheduling optimizer system 10. The present invention will be mainly described relative to a semiconductor manufacturing setting. It should be recognized, however, that the teachings of the invention are suitable for a variety of different applications.

As aforementioned, in a manufacturing environment, a device (e.g., a semiconductor device, a Cathode-ray tube, hard-drive, electronics, other devices affected by ESD, or other devices that may experience a yield loss due to a sensitivity, etc.), or a group of devices (e.g., an assembly lot) are assembled through an assembly unit, such as assembly unit 60. An "assembly unit" 60 may include the tools, assemblies, processes, activities, systems, etc., used or available for use in a manufacturing environment to assemble a device (not shown), or assembly lot (not shown), or any of the aforementioned used for moving during manufacturing, storing, shipping or otherwise related to a device. Assembling a device may include putting together multiple discrete items to make a single item, or, in the case of wafer manufacturing, allowing a continuous assembly process. Examples of assembly unit 60 may include, but are not limited to: photolithography tools, testers, ion implant tools, furnaces, at least one tool used in the design and manufacturing of a semiconductor, or other devices that may be affected by ESD or other manufacturing sensitivities, such as hard-drives, Cathode-ray tubes, etc.; tools used in the moving or shipping of ESD sensitive devices; and processes or activities used in the manufacturing of a device, or a combination of any of the above.

Assembly unit 60 operates through a floor schedule. The floor schedule indicates the specific tools, activities, etc., that are to be used in the assembly of a device or assembly lot. The floor schedule of assembly unit 60 may be provided from scheduling optimizer system 10 through an automatic handling system (AMHS), which may be part of scheduling optimizer system 10; through other sources; or may be generated as a device or assembly lot is being manufactured. The floor schedule may include, but is not limited to: the movement of assembly lots between stocking points, bays and individual tools, the current lot locations, reticle locations, lot status, tool status, alternate routes, recipes, etc. In the present invention, the floor schedule may be optimized to reduce sensitivities (e.g., ESD sensitivities) during the operation of assembly unit 60.

Assembly unit 60 sends assembly data 42 to scheduling optimizer system 10 and receives an optimal path data 44 from scheduling optimizer system 10. Assembly data 42 may include, for example, information of a tool and its position and function, and sensitivity of the tool, etc. (tool set data), and sensitivity data of the device (e.g., ESD sensitivity data, or similar data involving risk factors of the device). Optimal path data 44 also indicates whether a tool or activity, etc., of assembly unit 60 should be shut down.

Testing unit 250 tests for sensitivities as a device is being assembled by assembly unit 60. The sensitivities may be from the device, assembly unit 60, or testing unit 250. This information is generated by testing unit 250 and may be sent to scheduling optimizer system 10 during the operation of assembly unit 60 so that scheduling optimizer system 10 may optimize the floor schedule of assembly unit 60 before other devices are affected by the sensitivities. Thus, testing unit 250 includes the tools or activities that gather and generate "testing data" 48 about the operation of assembly unit 60 and the information about the device or assembly lot assembly unit 60 is working on. Testing data 48 is sent to scheduling optimizer system 10 through messaging system 34. Testing data 48 may include reliability data (i.e., rules of what is allowable and what is not allowable for a device, tool or activity), and sensitivity data (which may be collected through direct charge or radio frequency) for a device, assembly lot and/or testing unit 250. Optimal path data 44 may also be sent to testing unit 250 from scheduling optimizer system 10 to indicate whether a tool or activity, etc., of testing unit 250 needs to be shut down.

Scheduling optimizer system 10 receives testing data 48 from testing unit 250 and assembly data 42 from assembly unit 60. Using this data, scheduling optimizer system 10 may estimate certain factors (e.g., the yield risk factors of an assembly lot, the risk factors of the sensitivities, etc.) of the device or assembly lot to decide whether to optimize the floor schedule of assembly unit 60. Then, optimization of the floor schedule may be achieved, for example, through the shutting down of a tool in assembly unit 60 or in testing unit 250, and/or the rerouting of the device to a different tool in assembly unit 60, indicated by optimal path data 44. Thus, scheduling optimizer system 10 may move a particular assembly lot to a different tool or activity of assembly unit 60 to reduce sensitivities caused from other tools or activities of assembly unit 60.

Messaging system 34 controls the movement of data between assembly unit 60, testing unit 250, and scheduling optimizer system 10. Real-time optimization of assembly unit 60 may occur because of messaging system 34. Hence, one aspect of the present invention is the real-time modification of the floor schedule of assembly unit 60 using scheduling optimizer system 10 and testing unit 250, thus allowing the avoidance or reduction of sensitivities during the assembly of a device or assembly lot.

ii. Scheduling Optimizer System

Figure 2:
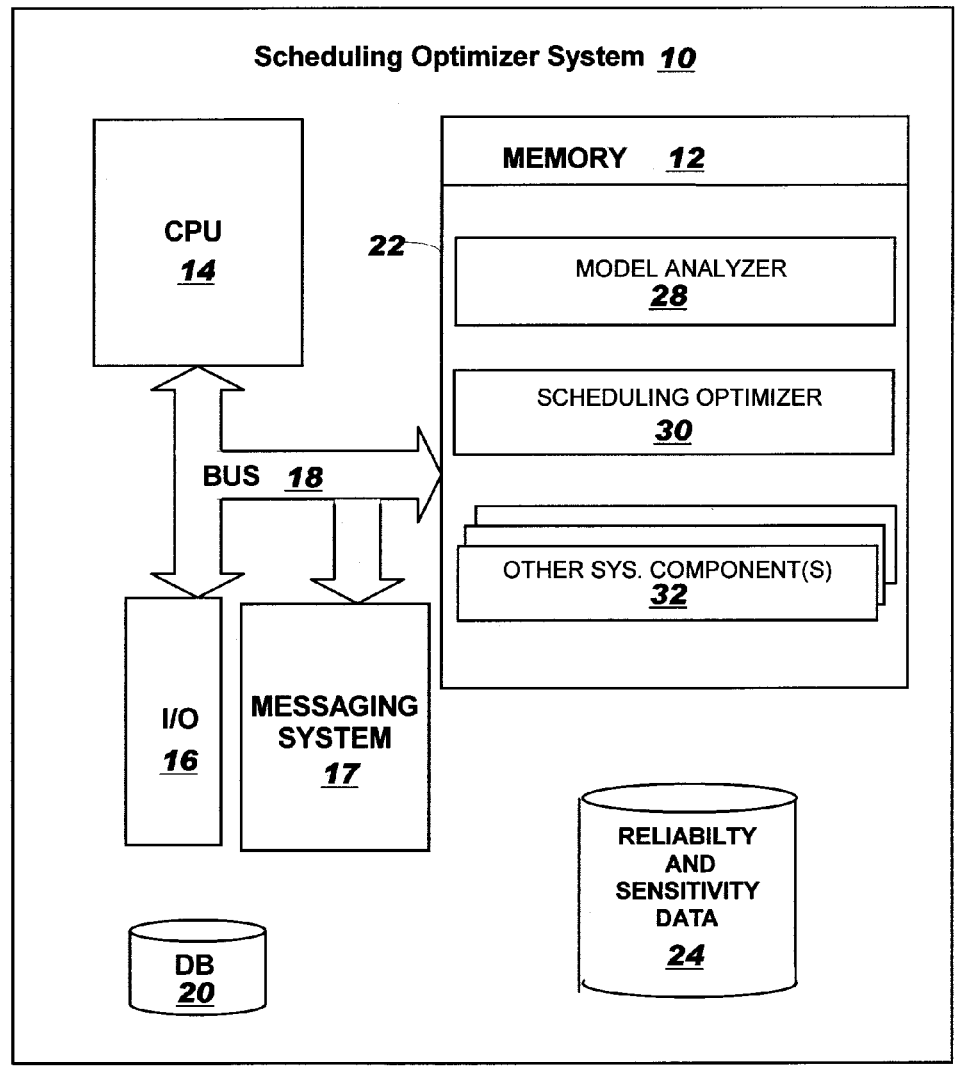
FIG. 2 is a block diagram illustrating a scheduling optimizer system in accordance with the present invention.

FIG. 2 is block diagram of one embodiment of a scheduling optimizer system 10 of FIG. 1 in accordance with the invention. As seen in FIG. 2, scheduling optimizer system 10 includes a memory 12, a central processing unit (CPU) 14, a messaging system 17, input/output devices (I/O) 16, a bus 18, a database 20, and a reliability and sensitivity data storage 24. Database 20 and reliability and sensitivity data storage 24 may be provided for storage of data relative to processing tasks, such as sensitivity data, reliability data, and optimal path data. Memory 12 includes a program product 22 that, when executed by CPU 14, comprises various functional capabilities described in further detail below. Memory 12, reliability and sensitivity data storage 24, and database 20 may comprise any known type of data storage system and/or transmission media, including magnetic media, optical media, random access memory (RAM), read only memory (ROM), a data object, etc. Moreover, memory 12, reliability and sensitivity data storage 24, and database 20 may reside at a single physical location comprising one or more types of data storage, or be distributed across a plurality of physical systems. CPU 14 may likewise comprise a single processing unit, or a plurality of processing units distributed across one or more locations.

Messaging system 17 may represent one specific messaging system, such as a messaging and queuing (MQ) queue system, or several different messaging systems and/or environments. Messaging system 17 may also comprise a single physical system or a plurality of systems distributed across one or more locations. Messaging system 34 (FIG. 1) may be part of messaging system 17 or may be part of a separate messaging system that may work in conjunction with messaging system 17.

I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 10.

As shown in FIG. 2, program product 22 may include model analyzer 28, scheduling optimizer 30, and other system components 32. Model analyzer 28 analyzes the sensitivity data received from assembly unit 60 (FIG. 1) and/or testing unit 250 (FIG. 1), and is discussed in greater detail with reference to FIG. 6 below. Scheduling optimizer 30 optimizes the floor schedule of assembly unit 60 (FIG. 1) based on the analyzed sensitivity data.

Figure 3:
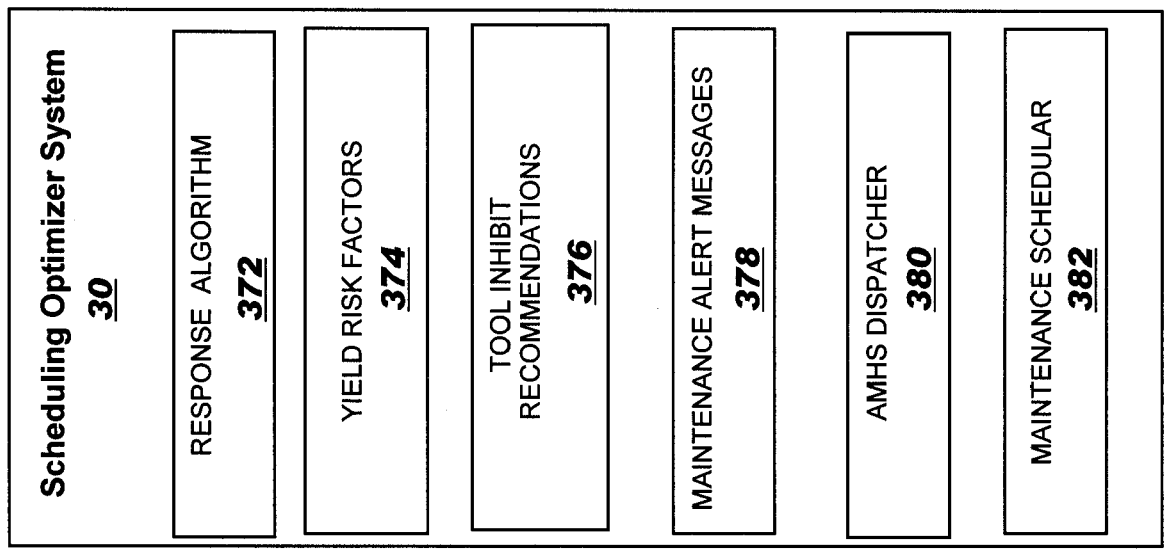
FIG. 3 is a block diagram illustrating a specific example of a scheduling optimizer of the scheduling optimizer system of FIG. 2.

FIG. 3 illustrates one embodiment of scheduling optimizer 30, which includes a response algorithm 372, a yield risk factors unit 374, a tool inhibit recommendations unit 376, a maintenance alert messages unit 378, an AMHS dispatcher 380 and a maintenance scheduler 382. Although these specific units are shown in scheduling optimizer 30 for this example, it is to be understood that other units may be included and/or the units shown may be independent of scheduling optimizer 30 (e.g., AMHS dispatcher 380 may be an independent unit that communicates with scheduling optimizer 30, etc.). Response algorithm 372 generates estimated yield factors for a device and/or assembly lot on each of the tools that could potentially be used on the device or assembly lot. Response algorithm 372 also provides the data needed for yield risk factors unit 374, tool inhibit recommendations unit 376, and maintenance alert messages unit 378. Yield risk factors unit 374 indicates relative preferences for one tool compared to another with respect to a predefined tool prioritization method (e.g., one tool utilizing less voltage than another tool). Tool inhibit recommendations unit 376 blocks dispatching of the device and/or assembly lot to a specified tool or tools. Maintenance alert messages unit 378 provides an alert message to maintenance scheduler 382, which schedules maintenance on tools based on associated priorities and target maintenance schedules. AMHS dispatcher 380 determines where to move the device and/or assembly lot depending on the data from yield risk factors unit 374 and tool inhibit recommendations unit 376 and optimizes the floor schedule accordingly through optimal path data 44 (FIG. 1). As aforementioned, optimal path data 44 (FIG. 1) includes the tools, etc., to be inhibited (i.e., shut down), and the optimized floor schedule for the device and/or assembly. One embodiment of an operational method of optimizer system 10 (FIG. 2) and program product 22 (FIG. 2), including scheduling optimizer 30, will be discussed in greater detail with reference to FIGS. 4 and 5 below.

Figure 4:
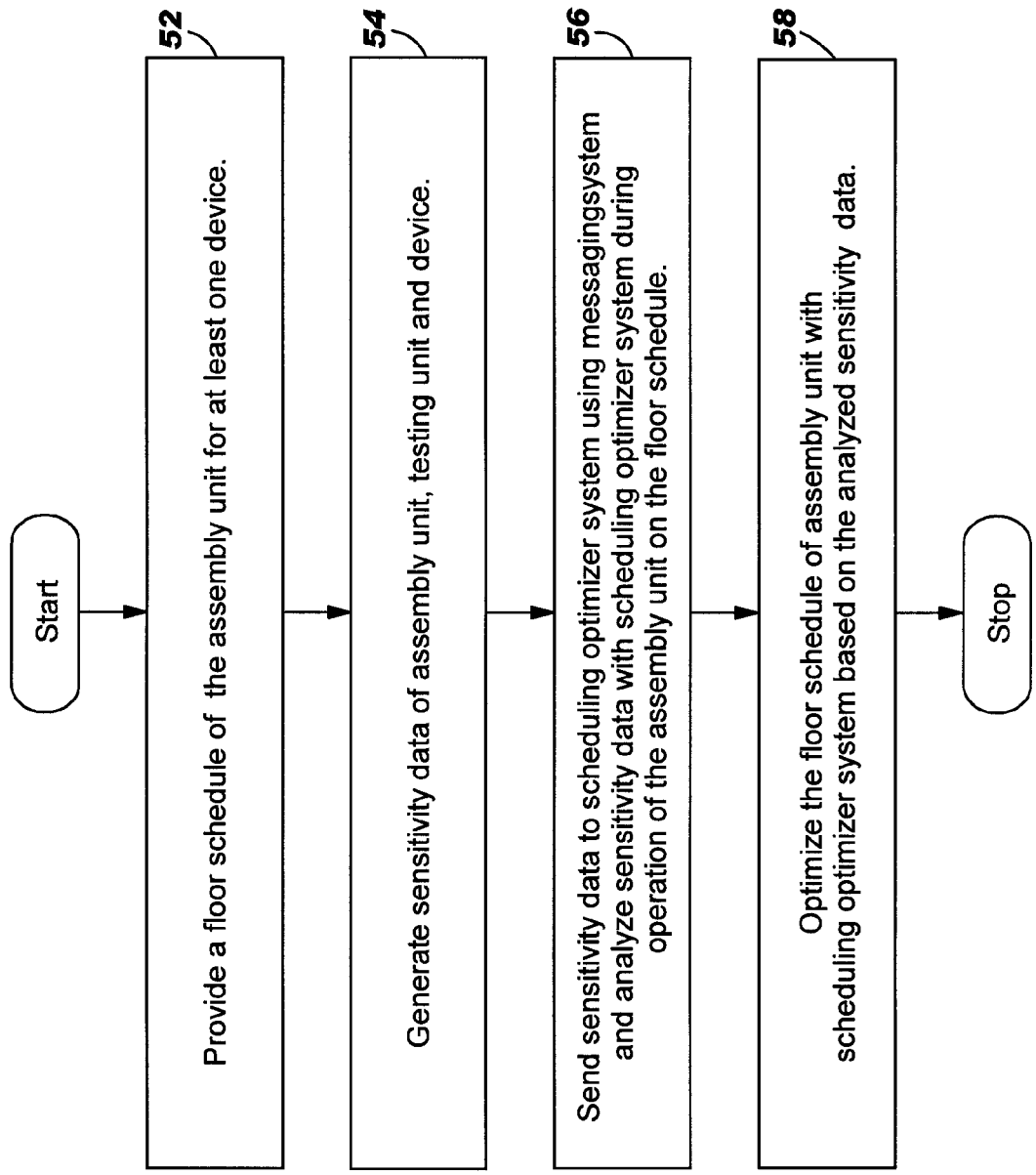
FIG. 4 is a flow diagram illustrating a method of the scheduling optimizer system and environment of FIGS. 1 and 2.

FIG. 4 is a flow diagram illustrating one embodiment of an operational method of system 10 (FIG. 2) in accordance with the present invention. FIG. 4 should be reviewed in conjunction with FIG. 1. As seen in FIG. 4, the first step 52 includes providing a floor schedule of assembly unit 60 for a device (not shown) to scheduling optimizer system 10 (FIG. 2). As aforementioned, the floor schedule is the scheduling and positioning of the assemblies and/or tools that manufacture a device or assembly lot.

The second step 54 includes generating sensitivity data for assembly unit 60, testing unit 250, and the device (not shown) or assembly lot (not shown) being assembled by assembly unit 60. If sensitivity data is already present for a device, then this step may be omitted. Sensitivity data is generated from assembly unit 60 and testing unit 250 during the operation of the assembly unit 60 according to the floor schedule. One example of generating sensitivity data is through generating statistical "sensitivity models." Sensitivity models represent the ESD failures of a device and may be used to estimate the yield factors of an assembly lot to determine if the floor schedule of the assembly lot or device should be optimized. Some examples of sensitivity models that are well-known in the art include: human body models (HBM); machine models (MM); charges device models (CDM); transmission line pulse (TLP), very fast transmission line pulse (VF-TLP), and cable discharge models; and cassette models, etc. Sensitivity models such as HBM, MM and CDM may be obtained through a simple resistor/capacitor circuit and are represented by the magnitude of the resulting waveform. These models may be stored in reliability and sensitivity data storage 24 (FIG. 2), in database 20 (FIG. 2), and/or in data storage units on assembly unit 60 (FIG. 1) and/or testing unit 250 (FIG. 1).

The next step 56 includes sending the sensitivity data to scheduling optimizing system 10 using messaging system 17. Thus, scheduling optimizing system 10 receives the sensitivity data from assembly unit 60 and testing unit 250 during operation of assembly unit 60 on the floor schedule. The sensitivity data may be generated and received in real-time, thus allowing the floor schedule to be optimized based on current sensitivity data.

The next step 58 includes optimizing the floor schedule of the assembly unit based on the sensitivity data of the device during operation of the assembly unit on the floor schedule. In optimizing the floor schedule, the sensitivity data from assembly unit 60 and testing unit 250 is first analyzed through model analyzer 28 (FIG. 2) of scheduling optimizer system 10 (FIG. 2). For example, model analyzer 28 (FIG. 2) may analyze a known sensitivity model to estimate a second sensitivity model in the case that the data from the second sensitivity model is incomplete. Then, the floor schedule of assembly unit 60 is optimized with scheduling optimizer 30

(FIG. 2) based on the analyzed data from model analyzer 28 (FIG. 2) of scheduling optimizer system 10 (FIG. 2). That is, scheduling optimizer 30 may generate estimated yield factors for an assembly lot, and depending on the results, change the floor schedule to correspond to the higher assembly lot yield factors. The operation of model analyzer 38 will be described in more detail below relative to FIG. 6.

The optimal path data 44 of the floor schedule is then sent back to assembly unit 60 and testing unit 250 through messaging system 34, indicating whether a tool or activity should be shut down and/or a device rerouted. Thus, testing unit 250 and assembly unit 60 receive the optimal path data 44 of the floor schedule based on the sensitivity data, wherein the optimal path data 44 controls the path of the device through the assembly unit.

Figure 5:
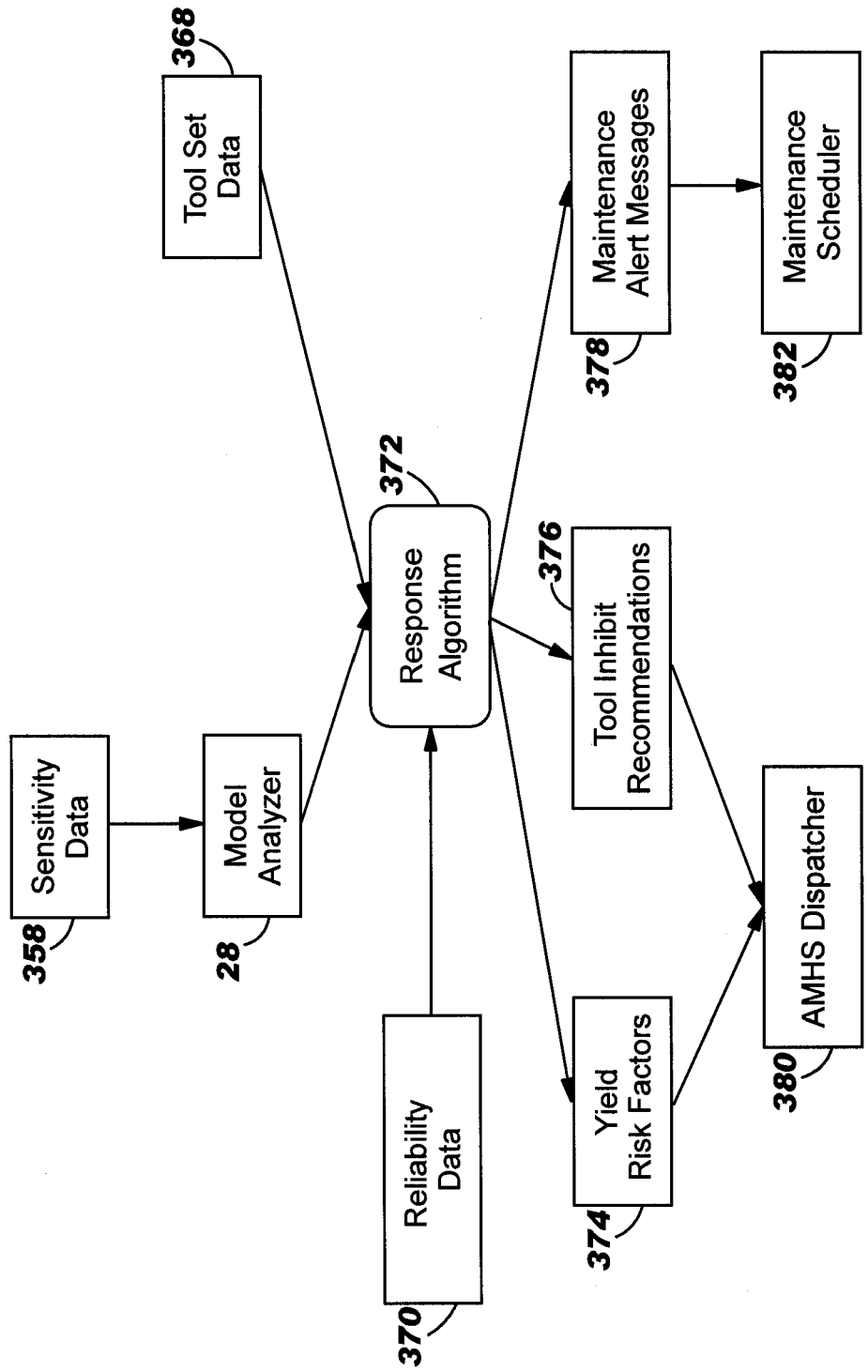
FIG. 5 is a block diagram illustrating an example of a data path through scheduling optimizer system of FIGS. 2 and 3.

Referring to FIG. 5, a data flow of scheduling optimizer system 10 (FIG. 2) will now be described. As aforementioned, the parts of system 10 may be on the same physical unit, or may be positioned throughout several locations (e.g., in different geographical locations throughout the world). Messaging system 17 (FIG. 2), or a similar system, establishes confirmation of the transfer of data and updates of scheduling optimizer system 10 (FIG. 2). Since all the parts in real-time may experience different sensitivity based on ambient humidity at the different locations, ESD robustness of the device, and compliance of the individual tools and facility with ESD standards, etc., messaging system 17 (FIG. 2) allows the real-time optimization of a floor schedule for optimal results of the assembly of devices.

As seen in FIG. 5, model analyzer 28 of scheduling optimizer system 10 (FIG. 2) receives sensitivity data 358 from testing unit 250 (FIG. 1), and/or assembly unit 60 (FIG. 1). Sensitivity data may be represented through different sensitivity models that are generated from testing unit 250 (FIG. 1) and/or assembly unit 60 (FIG. 1). Sensitivity models that represent sensitivity data for this example may include HBM, MM, CDM, TLP, VF-TLP, a cable discharge model, and/or a cassette model, etc. In generating the sensitivity models, ESD activities may be simulated and tested using ESD testers (e.g., ESD tools, activities, etc., that test for ESD). A device may be tested to quantify the ESD sensitivity of the device. As a result, a sensitivity model, such as HBM, MM and CDM, is then generated which represents the device sensitivity for a given design pass. This sensitivity model may be a function of the technology, the design, the design pass, and/or the tools at the time the device was formulated.

Figure 6:
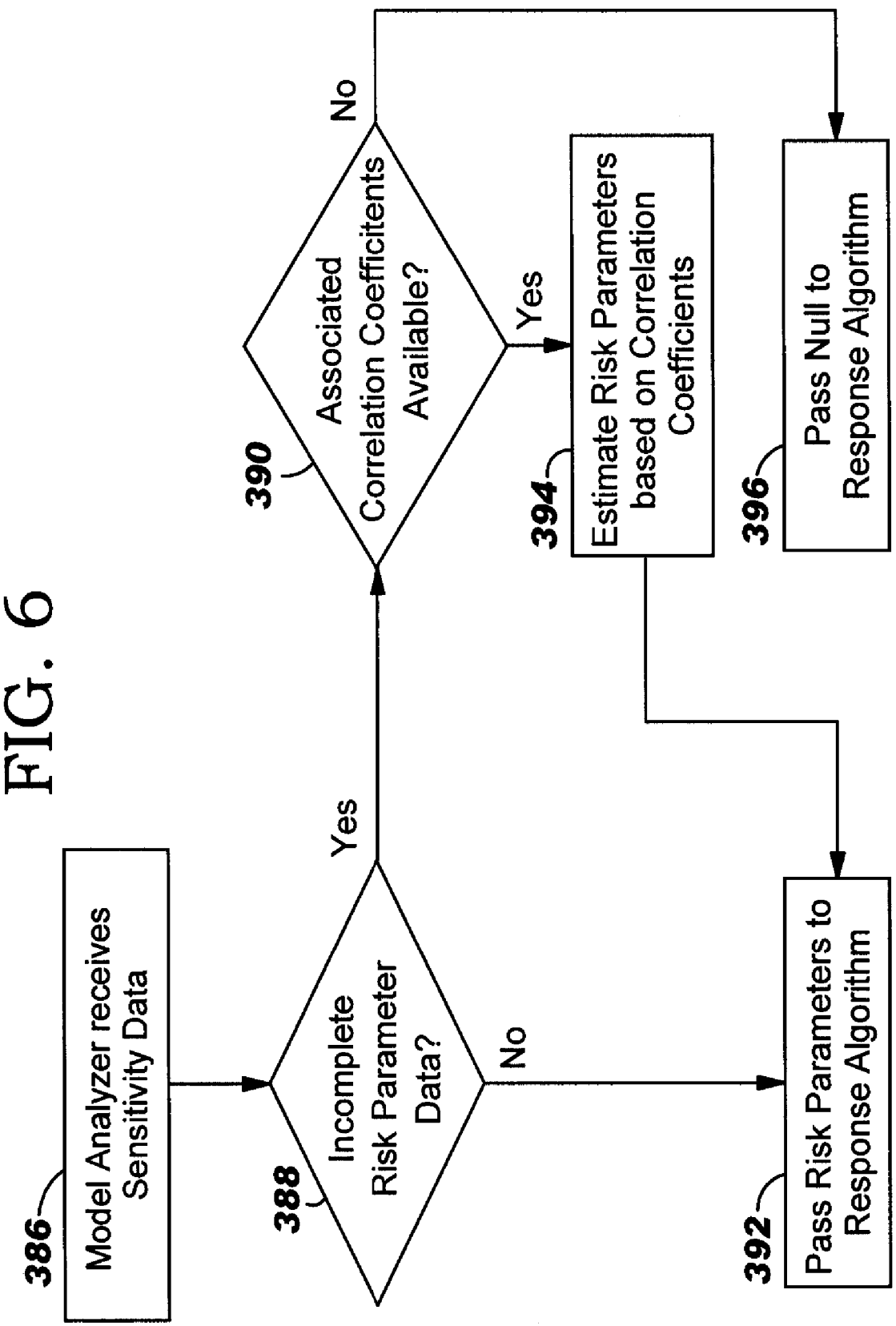
FIG. 6 is a flow diagram illustrating an example of a method of operation for the model analyzer of FIG. 2.

As mentioned above, the sensitivity data is then analyzed through model analyzer 28. Referring to FIG. 6, a flow diagram illustrating a method of operation of model analyzer 28 is discussed in further detail. As seen in FIG. 6, the first step 386 includes providing sensitivity data, such as HBM, MM, and CDM model data, to model analyzer 28 (FIG. 5).

The next step 388 includes determining if the risk parameter data of the sensitivity model data is complete (i.e., NO), or incomplete (i.e., YES). "Risk parameter data" may include parameters of the device that are at risk of ESD sensitivities (e.g., the amount of voltage a device can handle before the device will fail). If NO, the next step 392 includes passing risk parameter data to response algorithm 372 (FIG. 4).

If YES at step 388, the next step 390 includes determining if the associated correlation coefficients are available (i.e., YES) or not available (i.e., NO). "Correlation coefficients" are coefficients of sensitivity model data that correlate between each other. Correlation coefficients indicate whether a correlation exists between the known model data and the unknown model data. That is, there is a correlation between some ESD models, such as HBM, MM, TLP and VF-TLP models, allowing the prediction of one model from the results of another model (e.g., the magnitude of MM is approximately 5-10 times larger than the magnitude of HBM).

If YES is the result at step 390, the next step 394 includes estimating risk parameters based on the correlation coefficients. Using correlating coefficients, communication may be expedited even in the case that there is a lack of data from other sensitivity models or assessments. One method for estimating risk parameters for the missing risk parameter data includes using the mean and standard deviation of the associated failure rate function for the device type, though it is to be understood that alternative risk models and associated parameters could be substituted to estimate risk parameters that are within the scope of the invention. Specifically, a statistical sensitivity model may be used for prediction of ESD failures based on the device and the manufacturing environment. Algorithms containing the cumulative distribution result may be used for risk assessment and yield loss. Assuming a Gaussian distribution of the risk parameters, a probability distribution function can be defined for the power-to-failure distribution, wherein the power-to-failure distribution indicates the range amount of power a device can handle before the device fails.

The power-to-failure distribution algorithm is as follows:

$$f_{P_f}(P_f) = \frac{1}{\sqrt{2\pi} S_p} \exp\left\{-1\left/2\left[\frac{P_f - \langle P_f \rangle}{S_p}\right]^2\right.\right\}$$

wherein $f_{P_f}(P_f)$ is the probability distribution function of power-to-failure, $P_f$ is the power-to-failure variable and $S_p$ is the standard deviation.

The standard deviation algorithm is as follows:

$$S_p = \left[\frac{1}{N-1}\sum_{i=1}^{N}\{P_{f_i} - \langle P_f \rangle\}^2\right]^{1/2}$$

wherein $S_p$ is the standard deviation, and $P_f$ is the power-to-failure variable.

The next step, step 392 includes passing the estimated risk parameters to response algorithm 372 (FIG. 5).

In some cases, sensitivity model data may be missing and correlation coefficients may not be available, or may be considered unreliable (i.e., step 390=NO). Thus, the next step 396 includes passing a null to response algorithm 372 (FIG. 5). If a null is passed to response algorithm 372 (FIG. 5), default risk parameters may be used that are conservative estimates based on reliability data across all device types.

Returning now to FIG. 5, the data from model analyzer 28, along with tool set data 368 and reliability data 370, is sent to response algorithm 372. Tool set data 368, which contains real-time data based on the sensitivities measurements for the set of tools that are available for assembly of assembly lots, is sent from assembly unit 60 (FIG. 1). Tool set data 368 may also include data with probability distribution parameters, which are parameters estimated from the probability distribution function formula used for model analyzer 28. Reliability data 370 of a device is sent from testing unit 250 (FIG. 1).

As aforementioned, response algorithm 372 is an algorithm used in scheduling optimizer 30 (FIG. 2). Using reliability data 370, response algorithm 372 may prioritize the inspection and testing of the device by testing unit 250 (FIG. 1) for sensitivities. For example, inspection prioritization may be generated by response algorithm 372 and used by testing unit 250 (FIG. 1) for the inspection of mask devices. Specifically, in a mask device, the risk of ESD sensitivities occurring between lines of a photomask and/or reticle increases or decreases depending on several factors. These factors, which may be represented as reliability data 370, include: mask level; process; technology; and spacing distributions. Mask level prioritization may be based on the ESD sensitivity of a mask level (e.g., PC, M1, M2, M3, RX, CA, etc.). ESD sensitivity of the mask level increases with larger shapes close together, so PC and metal levels are at more risk than CA shapes.

Different processes, such as a phase shift process or a non-phase shift process may increase or decrease the risk of ESD sensitivity in a mask and should be prioritized accordingly. Different process yields may also increase or decrease the risk of ESD sensitivity. In technology, newer technology will increase the risk of ESD sensitivity since the line-to-line space is decreased in mask manufacturing.

Spacing distributions prioritization may be based on the size of the space on a mask. For a first size of space, a first tool may be used since ESD damage may be more noticeable based on the discharge level. For a second size of space, a second tool may be used since the discharges may be at a lower level, but occur more frequently than the discharges with the first size of space. The first size of space is generally larger than the second size of space. The damage from the second size of space may be latent. Inspection of the first size of space and the second size of space may be prioritized based on the ESD damage patterns, which are distinct patterns representing the type of ESD discharge made in the mask.

Response algorithm 372 also generates estimated yield factors for the assembly lot on each of the tools that could potentially be used on the assembly lot based on the cumulative distribution function used to obtain probability P ($P_{ftool}$>$P_{fdevice}$). For example, if there were three photolithography tools (A, B, C) that could be used for the production of assembly lot, then response algorithm 372 could compute yield percentages for each tool (e.g., 70%, 90%, and 80%). If the probability of yield loss on a particular tool is below the required reliability specification, then response algorithm 372 initiates an inhibit request through tool inhibit recommendations unit 376 to AMHS dispatcher 380. The inhibit request includes the tools, etc., to be inhibited (i.e., shut down). Furthermore, response algorithm 372 provides data to maintenance alert message unit 378 if the tools ESD measurement falls within a predefined range of values. Maintenance alert message unit 378 can then provide an alert message to maintenance scheduler 382, which schedules maintenance on tools based on associated priorities and target maintenance schedules.

Figure 7:
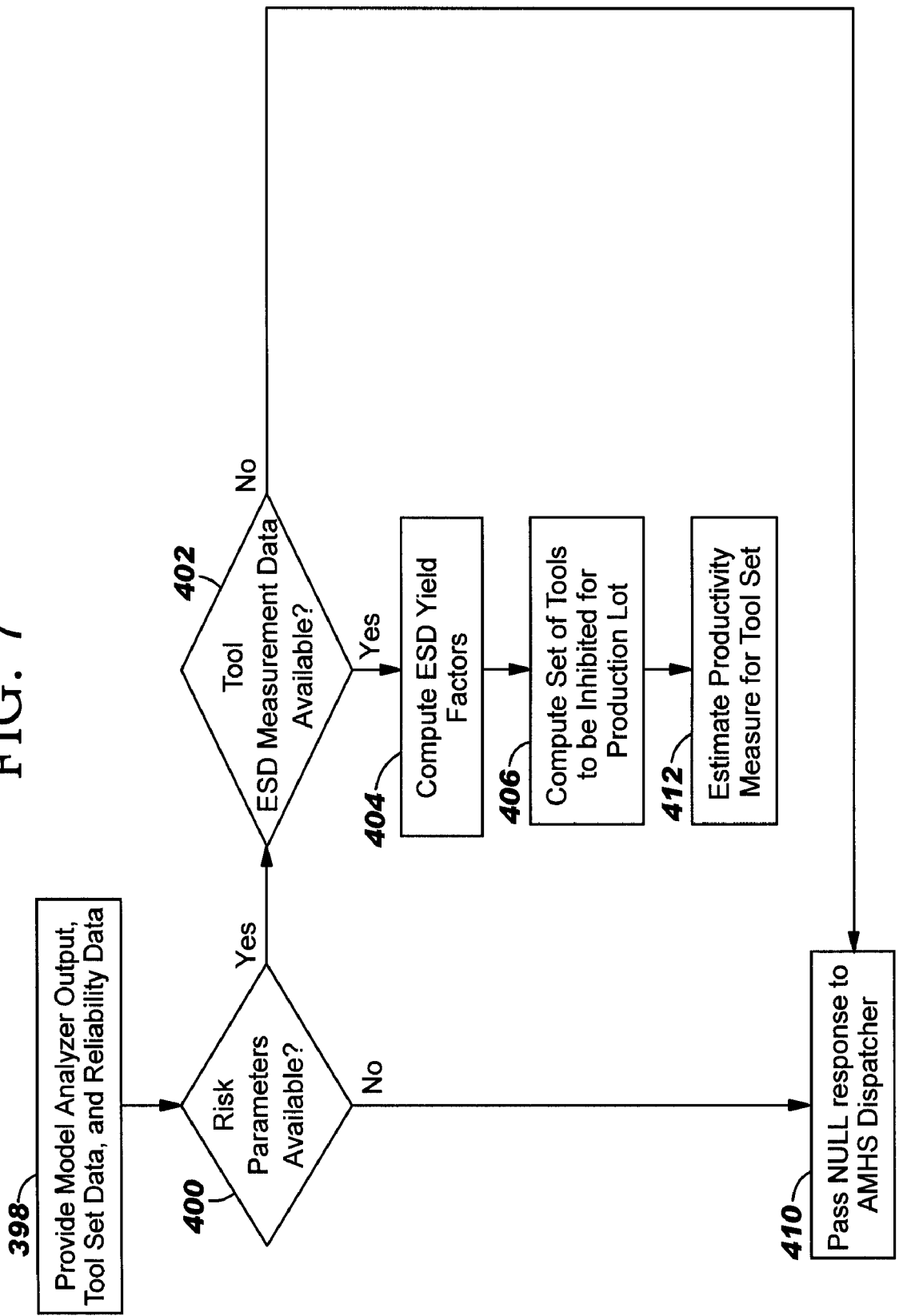
FIG. 7 is a flow diagram illustrating an example of a method of operation for the response algorithm of FIG. 3.

Referring to FIG. 7, a flow diagram illustrates a method of operation of response algorithm 372. As seen in FIG. 7, the first step 398 includes providing the output of model analyzer 28 (FIG. 5), tool set data 368 (FIG. 5), and reliability data 370 (FIG. 5) to response algorithm 372 (FIG. 5). The next step 400 includes determining if the risk parameters (i.e., the mean and standard derivation of $P_{ftool}$ and $P_{fdevice}$) are available from model analyzer 28 (FIG. 5) (i.e., YES), or not available (i.e., NO). If NO at step 400, the next step 410 includes passing a NULL response to AMHS dispatcher 380 (FIG. 3).

If YES is the result at step 400, the next step 402 includes determining if tool ESD measurement data is available (i.e., YES), or not available (i.e., NO). If NO is the result at step 402, the next step 410 includes passing a NULL response to AMHS dispatcher 380 (FIG. 3).

If YES is the result at step 402, the next step 404 includes computing the yield factors. That is, the cumulative distribution function is used to obtain the probability P ($P_{ftool}$>$P_{fdevice}$). This result is sent to yield risk factors unit 374 (FIG. 3) so that the tools to be used for assembly unit 60 (FIG. 1) may be prioritized.

The next step 406 includes computing the set of tools to be inhibited for an assembly lot, which results are sent to tool inhibit recommendations unit 376 (FIG. 3). That is, if the probability of yield loss on a particular tool is above the required reliability specification, then response algorithm 372 (FIG. 3) initiates an inhibit request through tool inhibit recommendations unit 376 (FIG. 3) to AMHS dispatcher 380 (FIG. 3), which determines where to move the device and/or assembly lot. The final step 412 includes estimating the productivity measure for the tools that may be used, which results are sent to maintenance alert messages unit 378 (FIG. 3). That is, response algorithm 372 (FIG. 3) provides data to maintenance alert message unit 378 (FIG. 3) if the tools ESD measurement falls within a predefined range of values. The data is used to indicate which tool or tools need servicing.

Returning now to FIG. 5, the resulting data of response algorithm 372 is sent to yield risk factors unit 374, tool inhibit recommendations unit 376 and maintenance alert messages unit 378. Data from yield risk factors unit 374 indicates relative preference for one tool compared to another with respect to a predefined tool prioritization method (e.g., one tool utilizing less voltage than another tool). Data from tool inhibit recommendations unit 376 may be used to block dispatching of the assembly lot to a specified tool or tools. Data from maintenance alert messages unit 378 provide an alert message to maintenance scheduler 382, which include: 1) the number of lots unserviceable by any tool; and 2) the average number of product types serviceable by tool i, for i=1, . . . , N, where N is the number of alternate tools that the assembly lot may be dispatched to. The first alert message provides a measure as to the importance of servicing assembly unit 60 (FIG. 1). The second alert message provides a measure as to the importance of servicing the tool with respect to tool efficiency (e.g., tool throughput). Thus, these measures may be used to prioritize the scheduling of ESD maintenance activities for assembly unit 60 (FIG. 1).

The resulting data of maintenance alert messages unit 378 is sent to maintenance scheduler 382. Maintenance scheduler 382 schedules ESD maintenance on tools based on associated priorities and target maintenance schedules.

The resulting data of yield risk factors unit 374 and tool inhibit recommendations unit 376 are sent to AMHS dispatcher 380. The AMHS dispatcher 380 decides where to move the assembly lot (e.g., to which available tool) depending on the data received from yield risk factors unit 374, tool inhibit recommendations unit 376, as well as other relevant data including: lot priority, critical ratio of the risk yield factors, setup times at the tool, current workload at each tool, etc., and optimizes the floor schedule accordingly through optimal path data.

The resulting data, which corresponds to the optimal path data, of AMHS dispatcher 380 and maintenance scheduler 382 are sent to assembly unit 60 (FIG. 1), testing unit 250 (FIG. 1), and any other unit that may be used in the assembly or maintenance of the system through messaging system 34 (FIG. 1).

iii. Assembly Unit with Messaging System

Figure 8:
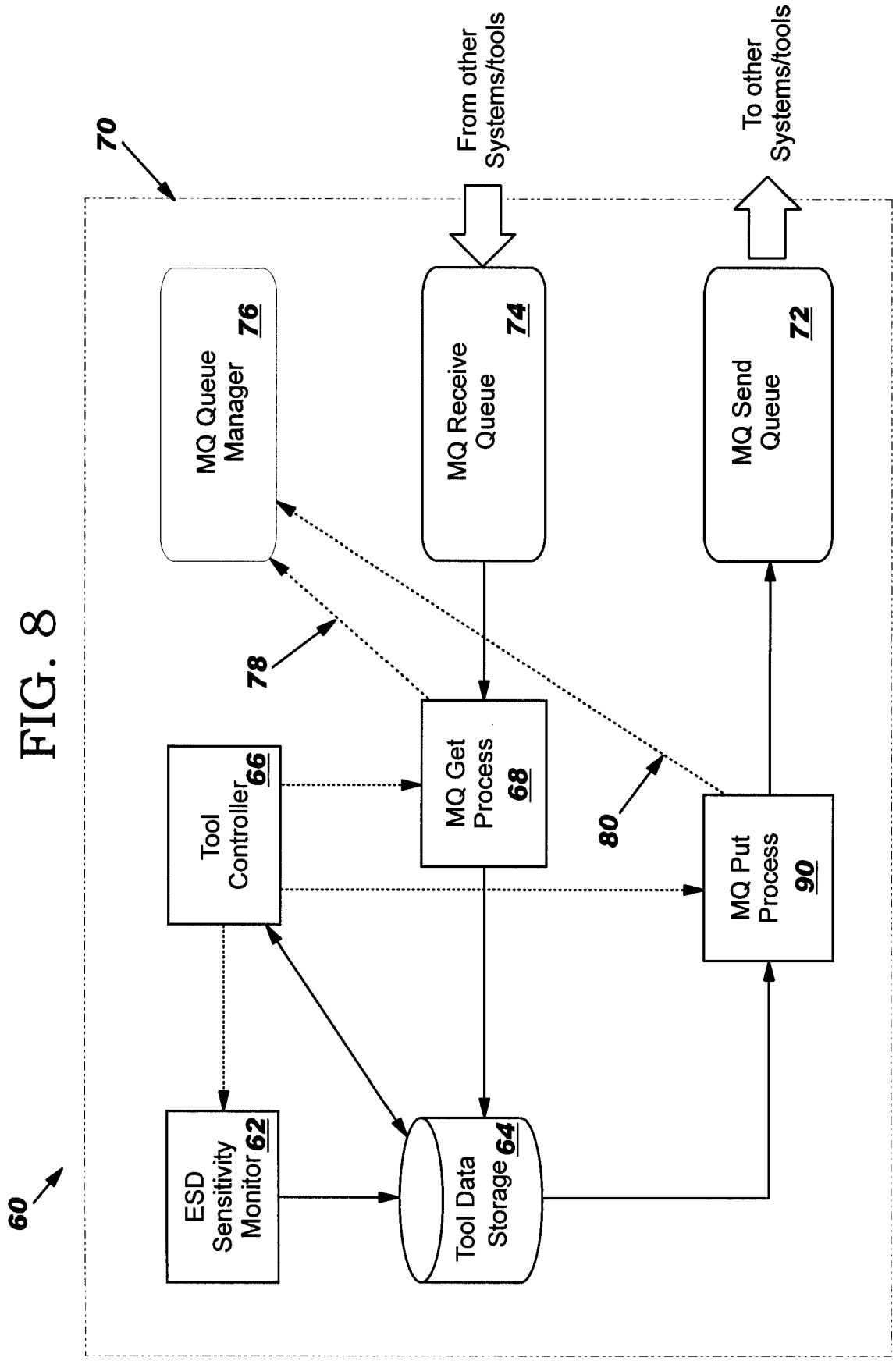
FIGS. 8 and 9 are block diagrams of specific examples of an assembly unit and messaging system that may be used in the environment of FIG. 1.
Figure 9:
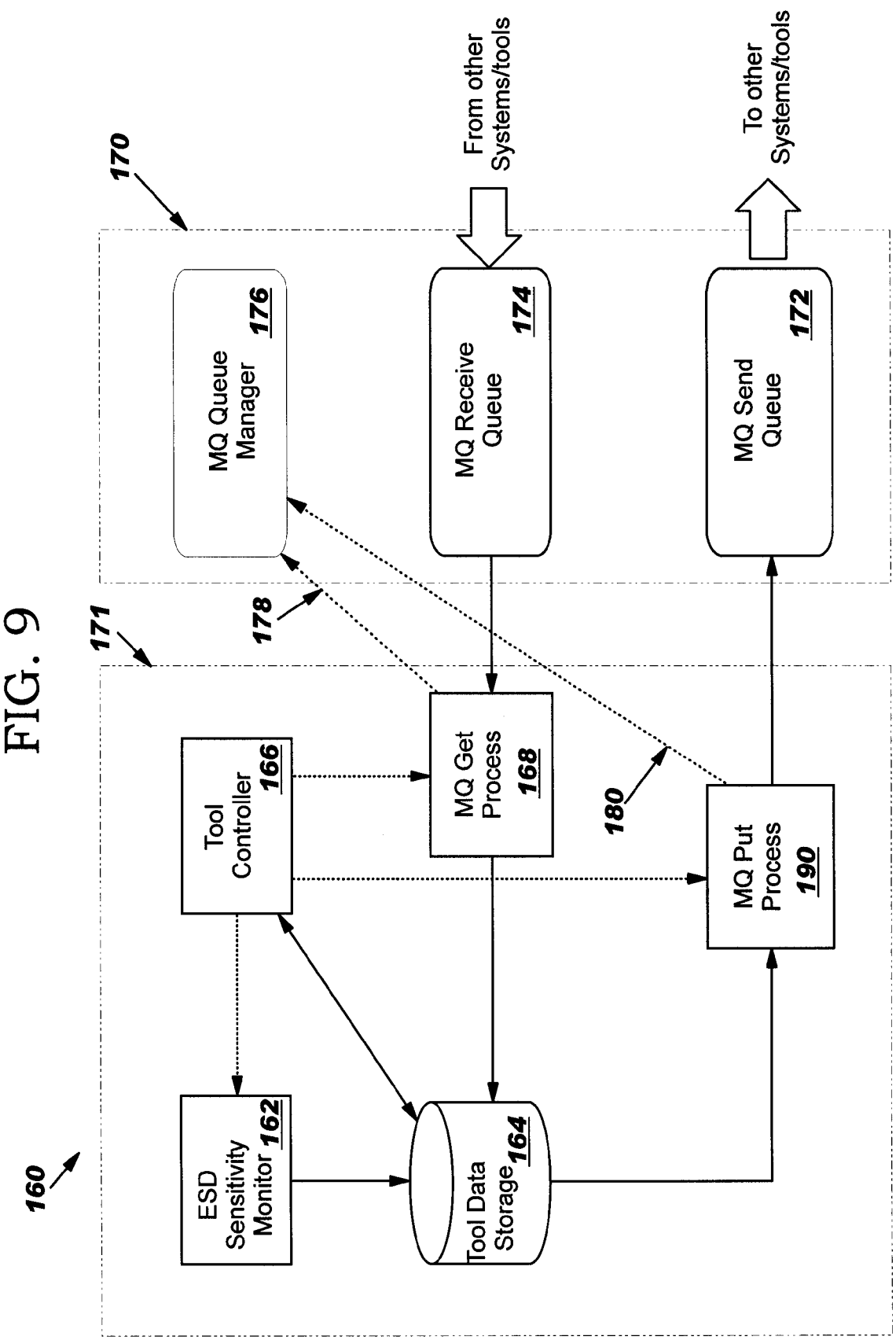

FIGS. 8 and 9 are block diagrams of two specific examples of assembly unit 60 (FIG. 1) for a tool (not shown). Although only two examples are shown specifically, other examples may be used that are within the scope of the invention.

FIG. 8 illustrates a specific tool assembly unit 60 comprising tool controller 66, ESD sensitivity monitor 62, tool data storage 64, MQ Get process 68 and MQ Put process 90, which are on the same physical unit 70 as MQ queue manager 76, MQ receive queue 74 and MQ send queue 72.

In operation, tool controller 66 invokes ESD sensitivity monitor 62 to generate the tool's ESD sensitivity data. ESD sensitivity data is stored in tool data storage 64, which contents are accessible to ESD sensitivity monitor 62, tool controller 66, MQ Get process 68 and MQ Put process 90. Tool controller 66 then invokes MQ Put process 90 to send the data to scheduling optimizer system 10 (FIG. 1) through MQ send queue 72. In this specific example, MQ Put process 90 makes a direct MQ connection 80 to MQ queue manager 76 using direct MQ application programming interfaces (APIs) and sends the tool sensitivity data as an MQ message.

Tool controller 66 then invokes MQ Get process 68, which makes a direct MQ connection 78 to MQ queue manager 76 using direct MQ APIs and receives the optimal path data of the floor schedule as an MQ message through MQ receive queue 74. Tool controller 66 uses the optimal path data to determine if the tool is to continue to be in service or is to be removed from the manufacturing process (e.g., shut down).

Although in this specific example, ESD sensitivity monitor 62 is invoked by tool controller 66 to generate ESD sensitivity data, it is to be understood that ESD sensitivity monitor 62 may also run independently to generate the sensitivity data which is then independently sent to scheduling optimizer system 10 (FIG. 1). Similarly MQ Get process 68 could run independently to receive the optimal path data from scheduling optimizer system 10 (FIG. 1), and tool controller 66 could run independently to use this data.

Pseudo-code for the direct-MQ-manufacturing-tool-controller process of FIG. 7 is shown below:

```
Begin-direct-MQ-manufacturing-tool-controller-process.
Set shutdown-flag to FALSE.
Load configuration information like log-filename, support-
email-id, etc. from the configuration file.
Repeat
Invoke sensitivity-monitor process.
If sensitivity-monitor process returns error
Log the error in log-file.
Send an email-alert about the error to the support-
email-id.
Else
Invoke direct-MQ-Put process to send the tool-sensitivity
data via MQ.
If direct-MQ-Put process returns error
Log the error in log-file.
Send an email-alert about the error to the support-
email-id.
End-if
End-if
Invoke direct-MQ-Get process to receive the optimal-
path-information.
If direct-MQ-Get process returns error
Log the error in log-file.
Send an email-alert about the error to the support-
email-id.
Else
If shutdown-information received
Set shutdown-flag to TRUE.
Log the shutdown-information in log-file.
Send an email-alert about the shutdown-time to the support-
email-id.
End-if
End-if
Until shutdown-flag = TRUE
End-direct-MQ-manufacturing-tool-controller-process.
```

Pseudo-code for the direct-MQ-Put process 90 is shown below:

```
Begin-direct-MQ-Put-process.
Get direct-connection to MQ-queue-manager.
If direct-connection failed
Return error.
End-if
Open the MQ-send-queue in send-mode.
If open MQ-send-queue failed
Return error.
End-if
Send the data as an MQ message on the MQ-send-queue.
If sending of data failed
Return error.
End-if
End-direct-MQ-Put-process.
```

Pseudo-code for the direct-MQ-Get process 68 is shown below:

```
Begin-direct-MQ-Get-process.
Get direct-connection to MQ-queue-manager.
If direct-connection failed
Return error.
End-if
Open the MQ-receive-queue in receive-mode.
If open MQ-receive-queue failed
Return error.
End-if
Read the MQ message from the MQ-receive-queue.
If receiving of data failed
Return error.
End-if
End-direct-MQ-Get-process.
```

FIG. 9 illustrates a specific example of a tool assembly unit 160 including tool controller 166, ESD sensitivity monitor 162, tool data storage 164, MQ Get process 168 and MQ Put process 190 on one physical unit 171 and MQ queue manager 176, MQ receive queue 174 and MQ send queue 172 on a separate physical unit 170. In this example, one MQ queue manager 176 may be used for several tools, or tool assembly units, as opposed to the previous example where each tool had its own MQ queue manager 76 (FIG. 8). As seen in FIGS. 8 and 9, depending on the location of each unit, just one queue manager may be used to implement the entire system or multiple queue managers may be used to implement the system. Other factors like data size, data volume and data criticality also influence the decision of how many queue managers to use.

The operations for assembly unit 160 of FIG. 9 are similar in scope to the operations for assembly unit 60 of FIG. 8 with the exception of "client" MQ connections 178 and 180 being made between assembly unit 160 and scheduling optimizer system 10 (FIG. 1) with MQ queue manager 176 instead of "direct" MQ connections 78, 80 (FIG. 8). Appropriate changes may also be made in the pseudo-code discussed in reference to FIG. 8 to allow for a MQ client connection instead of a direct MQ connection. A client MQ connection basically indicates that a connection is made to a separate physical structure using client APIs, whereas a direct MQ connection indicates that a connection is made on the same physical structure using direct APIs.

Figure 10:
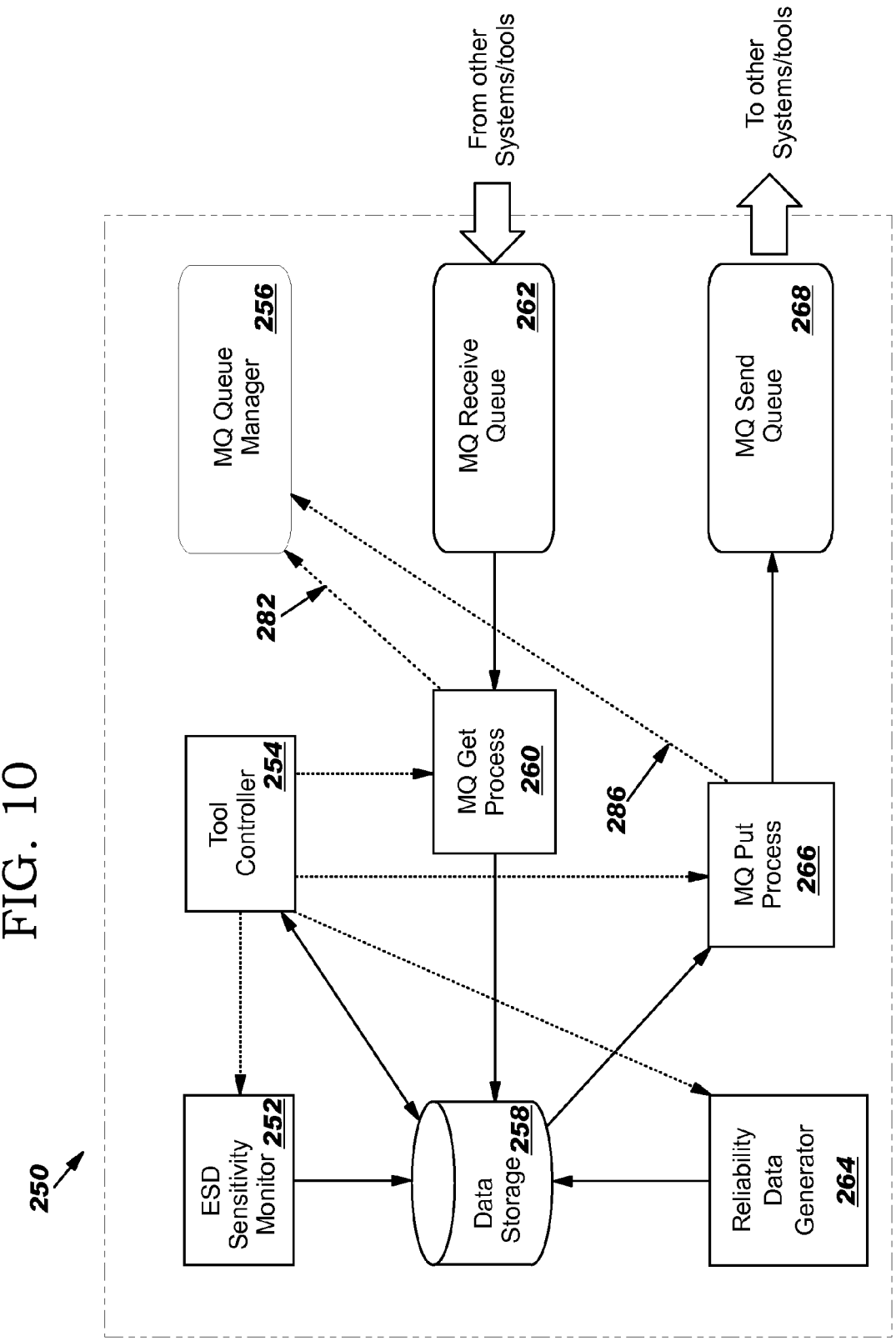
FIG. 10 is a block diagram of a specific example of a testing unit and messaging system that may be used in the environment of FIG. 1.

Also, as with the previous example, although tool controller 166 may invoke ESD sensitivity monitor 162 and MQ Get process 168, it is to be understood that ESD sensitivity monitor 162 may run independently to generate the sensitivity data, which is then independently sent to scheduling optimizer system 10 (FIG. 1). Similarly MQ Get process 168 may run independently to receive the optimal path data from scheduling optimizer system 10 (FIG. 1), and tool controller 166 could run independently to use this data.

iv. Testing Unit with Messaging System FIG. 10 is the block diagram for a specific example of testing unit 250 (FIG. 1). As with FIGS. 8 and 9, although a specific example is shown for testing unit 250, other examples may be used, (e.g., portions of testing unit 250 that may be on separate physical units, see FIG. 9) that are within the scope of the invention.

FIG. 10 illustrates a specific tool testing unit 250 comprising tool controller 254, ESD sensitivity monitor 252, data storage 258, reliability data generator 264, MQ Get process 260 and MQ Put process 266, which are on the same physical unit as MQ queue manager 256, MQ receive queue 262 and MQ send queue 268. Since testing unit 250 has its own MQ queue manager 256 for this example, MQ Put process 266 and MQ Get process 260 make direct MQ connections 286 and 282, respectively to MQ queue manager 256.

Data storage 258 is accessible to ESD sensitivity monitor 252, tool controller 254, reliability data generator 264, MQ Get process 260 and MQ Put process 266. Although not shown, MQ queue manager 256, MQ receive queue 262 and MQ send queue 268 may be on a separate physical unit than the rest of testing unit 250. Thus, one MQ queue manager may be used for several testing tools, or testing units, as opposed to each tool having its own MQ queue manager 256. The connections would be similar to the connections for FIG. 10, except instead of direct MQ connections 282 and 286 to MQ queue manager 256, client MQ connections would be made to MQ queue manager 256.

In operation, tool controller 254 invokes ESD sensitivity monitor 252 to generate the tool's ESD sensitivity data. Tool controller 254 also invokes the product's reliability data generator 264 to generate the product's reliability data. The tool's ESD sensitivity data and the product's reliability data may be stored in data storage 258. Tool controller 254 then invokes MQ Put process 266 to send the sensitivity and reliability data to scheduling optimizer system 10 (FIG. 1) through MQ send queue 268. In this specific example, MQ Put process 266 makes a direct MQ connection 286 to MQ queue manager 256 using direct MQ APIs and sends the sensitivity and reliability data as an MQ message.

Tool controller 254 then invokes MQ Get process 260, which makes a direct MQ connection 282 to MQ queue manager 256 using direct MQAPIs and receives the optimal path data of the floor schedule as an MQ message through MQ receive queue 262. Tool controller 254 uses the optimal path data to determine if the tool is to continue to be in service or is to be removed from the manufacturing process (e.g., shut down).

Although in this specific example, ESD sensitivity monitor 252 is invoked by tool controller 254 to generate ESD sensitivity data, it is to be understood that ESD sensitivity monitor 252 may also run independently to generate the sensitivity data which is then independently sent to scheduling optimizer system 10 (FIG. 1). Similarly MQ Get process 260 could run independently to receive the optimal path data from scheduling optimizer system 10 (FIG. 1), and tool controller 254 could run independently to use this data.

Pseudo-code for the direct-MQ-testing-tool-controller process of FIG. 9 is shown below:

```
Begin-direct-MQ-testing-tool-controller-process.
Set shutdown-flag to FALSE.
Load configuration information like log-filename, support-
  email-id, etc. from the configuration file.
Repeat
Invoke sensitivity-monitor process.
If sensitivity-monitor process returns error
Log the error in log-file.
Send an email-alert about the error to the support-
  email-id.
Else
Invoke test-data-generator process.
If test-data-generator process returns error
Log the error in log-file.
Send an email-alert about the error to the support-
  email-id.
Else
Invoke direct-MQ-Put process to send the tool-sensitivity
  and device-reliability data via MQ.
If direct-MQ-Put process returns error
Log the error in log-file.
Send an email-alert about the error to the support-
  email-id.
End-if
End-if
End-if
Invoke direct-MQ-Get process to receive the optimal-
  path-information.
If direct-MQ-Get process returns error
Log the error in log-file.
Send an email-alert about the error to the support-
  email-id.
Else
If shutdown-information received
Set shutdown-flag to TRUE.
Log the shutdown-information in log-file.
Send an email-alert about the shutdown-time to the support-
  email-id.
End-if
End-if
Until shutdown-flag=TRUE
End-direct-MQ-testing-tool-controller-process.
```

As aforementioned, a client MQ connection may be made instead of a direct MQ connection. Thus appropriate changes may be made in the pseudo-code to allow for this.

v. Scheduling Optimizer with Messaging System

Figure 11:
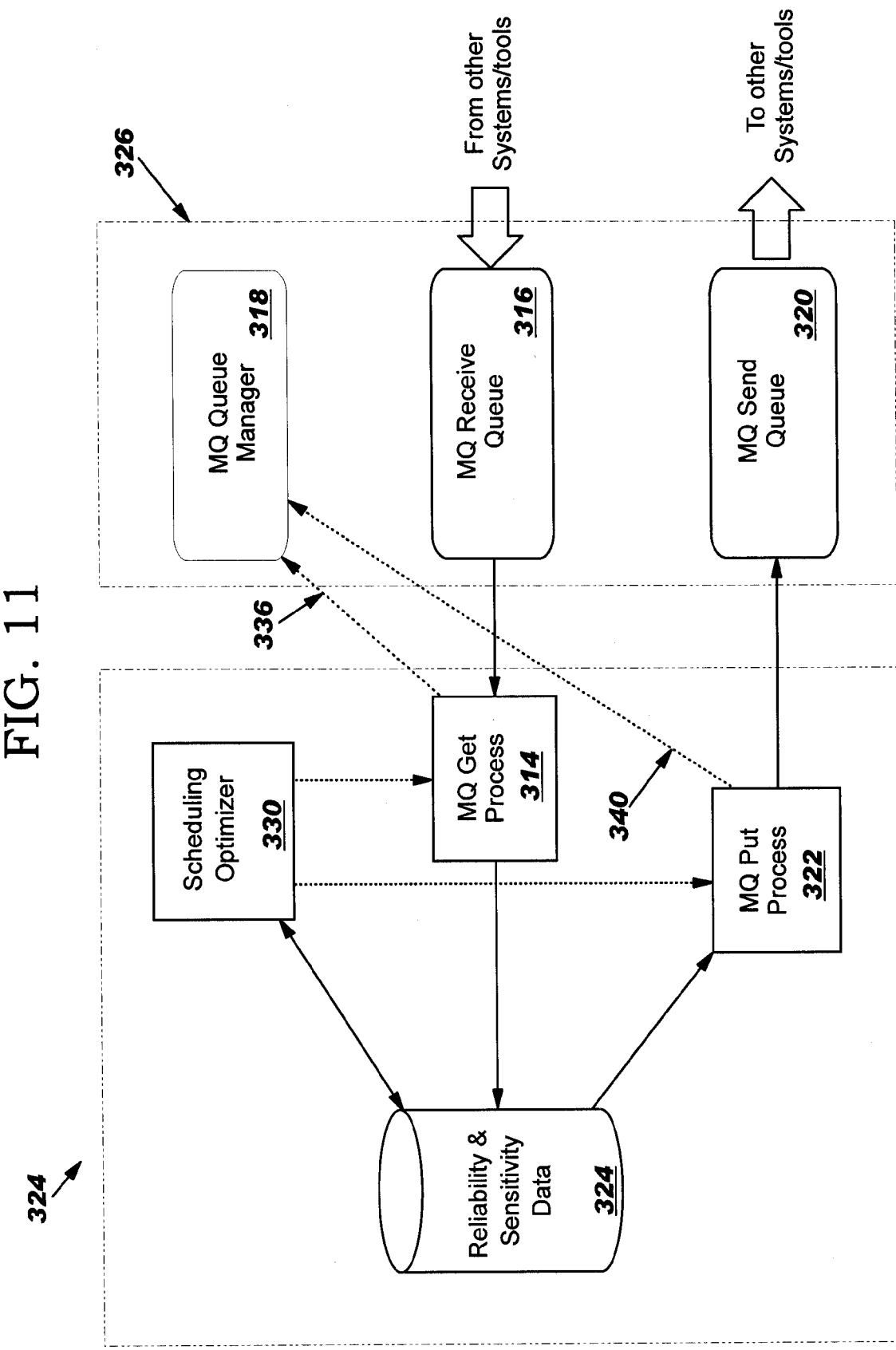
FIG. 11 is a block diagram of an example of a messaging system for the scheduling optimizer system of FIG. 2.

FIG. 11 illustrates a specific example of messaging system 17 (FIG. 2) between scheduling optimizer 330 and reliability and sensitivity data storage 324 of scheduling optimizer system 10 (FIG. 1) and other systems and tools. Scheduling optimizer 330 may be part of scheduling optimizer 30 (FIG. 2), or may be part of a separate optimizer system that may work in conjunction with scheduling optimizer 30 (FIG. 2). Furthermore, reliability and sensitivity data storage 324 may be part of database 20 (FIG. 2) or reliability and sensitivity data storage 24 (FIG. 2), or may be part of a separate data storage that may work in conjunction with database 20 (FIG. 2) or reliability and sensitivity data storage 24 (FIG. 2). In this specific example, MQ Get process 314 and MQ Put process 322 of messaging system 17 (FIG. 2) are on the same physical unit 324 as scheduling optimizer 330 and reliability and sensitivity data storage 324. MQ queue manager 318, MQ receive queue 316 and MQ send queue 320 are on a separate physical unit 326. Since MQ queue manager 318 is on a separate physical unit 326, client MQ connections 336 and 340 are made to MQ queue manager 318. Reliability and sensitivity data storage 324 is accessible to scheduling optimizer 330, MQ Get process 314 and MQ Put process 322. Although not shown, MQ queue manager 318, MQ receive queue 316 and MQ send queue 320 may be on the same physical unit as unit 324. The connections would be similar to the connections for FIG. 10, except instead of client MQ connections 336 and 340 to MQ queue manager 318, direct MQ connections would be made to MQ queue manager 318.

In operation, scheduling optimizer 330 invokes MQ Get process 314 to receive sensitivity and device reliability data from assembly unit 60 (FIG. 1) and testing unit 250 (FIG. 1). Sensitivity and device reliability data is received through a client MQ connection 336 to MQ queue manager 318 and stored in reliability and sensitivity data storage 324. An optimal floor schedule is determined through scheduling optimizer system 10 (FIG. 2) and is defined through optimal path data path. Scheduling optimizer 330 invokes MQ Put process 322 to send the optimal path data to assembly unit 60 (FIG. 1) and testing unit 250 (FIG. 1) through client MQ connection 340 to MQ queue manager 318.

Although in this specific example, MQ Get process 314 is invoked by scheduling optimizer 330 to receive sensitivity and reliability data, it is to be understood that MQ Get process 314 may also run independently to receive sensitivity and reliability data. Similarly the scheduling optimizer 330 could run independently to determine the optimal manufacturing path and the MQ Put process 322 could run independently to send the optimal path data.

Pseudo-code for the client-MQ-scheduling-optimizer 330 process is shown below:

```
Begin-client-MQ-scheduling-optimizer-process.
Set shutdown-flag to FALSE.
Load configuration information like log-filename, support-
email-id, etc. from the configuration file.
Repeat
Invoke client-MQ-Get process to receive the tool-
sensitivity and device-reliability data via MQ.
If client-MQ-Get process returns error
Log the error in log-file.
Send an email-alert about the error to the support-
email-id.
Else
Determine the optimal-path.
Invoke client-MQ-Put process to send the optimal-
path-information.
If client-MQ-Put process returns error
Log the error in log-file.
Send an email-alert about the error to the support-
email-id.
End-if
End-if
If administrator has asked for optimizer to terminate
Set shutdown-flag to TRUE.
Log the shutdown-information in log-file.
Send an email-alert about the shutdown-time to the support-
email-id.
End-if
Until shutdown-flag=TRUE
End-client-MQ-scheduling-optimizer-process.
```

As aforementioned, a direct MQ connection may be made instead of a client MQ connection. Thus, appropriate changes may be made in the pseudo-code to allow for this.

vi. Conclusion

The above-described invention provides a scheduling optimizer system, program product and method that analyzes a device or assembly lot for sensitivities, such as ESD sensitivities, analyzes the sensitivity of assembly lots relative to the tool sensitivity, and allows for modification of a floor schedule of the assembly unit based on the sensitivity of the device while improving the overall performance of the assembly unit.

Although ESD sensitivity is specifically discussed, the above-described invention may be applied to other device reliability sensitivities and activities, and is not limited to such. These activities may include latch-up, hot electron, mobile ion contamination, negative bias threshold instability (NBTI), other reliability mechanism, etc. This invention is also applicable to many technologies, such as semiconductors, magnetic recording (MR) industry, micromechanical machines (MEMs), and other nano-structures, etc.

It will be understood that the method steps discussed above are performed by a processor, such as CPU 14 (FIG. 2) of system 10 (FIG. 2), executing instructions of program product 22 (FIG. 2) stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. A method comprising the steps of:
   a. providing a floor schedule of an assembly unit for a device;
   b. optimizing the floor schedule based on sensitivity data of the device during operation of the assembly unit on the floor schedule; and
   c. receiving the sensitivity data and optimizing the floor schedule in real-time.

2. The method of claim 1, wherein the sensitivity data includes at least one of electrostatic discharge sensitivity data, electrical overstress sensitivity data, latch-up data, hot electron data, mobile ion contamination data, and negative bias threshold instability data.

3. The method of claim 1, further comprising the steps of generating sensitivity data for the device of an assembly unit during operation of the assembly unit on a floor schedule; and receiving an optimal path data of the floor schedule based on the sensitivity data, wherein the optimal path data controls the path of the device through the assembly unit.

4. The method of claim 1, wherein step b) further comprises a step of prioritizing a testing of the device for sensitivities.

5. The method of claim 4, wherein the prioritizing step includes prioritizing the testing of a mask based on a size of a space on the mask.

6. The method of claim 1, wherein step b) further comprises a step of analyzing the sensitivity data of the device to estimate an amount of sensitivity of the device.

7. The method of claim 1, wherein step b) further comprises a step of analyzing the sensitivity data through at least one sensitivity model to estimate an amount of sensitivity of the device.

8. The method of claim 7, wherein the sensitivity model includes at least one of a human body model, a machine model, a charged device model, a transmission line pulse model, and a very fast transmission line pulse model.

9. The method of claim 7, further comprising a step of estimating a result of the at least one sensitivity model with a second sensitivity model in the case that data of the at least one sensitivity model is incomplete.

10. The method of claim 1, wherein step b) further comprises a steps of inhibiting a failed tool of the assembly unit based on the sensitivity data; and optimizing the floor schedule to avoid the failed tool.

11. A computer program product comprising a non-transitory computer readable medium having computer readable program code embodied therein for optimizing a floor schedule of an assembly unit for a device, the program product comprising:
program code configured to analyze sensitivity data for the device during operation of the assembly unit on the floor schedule; and
program code configured to optimize the floor schedule of the assembly unit based on the sensitivity data.

12. The computer program product of claim 11, further comprising program code configured to generate the sensitivity data for the device being assembled by the assembly unit.

13. The computer program product of claim 11, wherein the analyzing program code analyzes the sensitivity data through at least one sensitivity model to estimate an amount of sensitivity of the device.

14. The computer program product of claim 13, wherein the sensitivity model includes at least one of a human body model, a machine model, a charged device model, a transmission line pulse model, and a very fast transmission line pulse model.

15. The computer program product of claim 14, wherein the analyzing program code further estimates a result of the at least one sensitivity model with a second sensitivity model in response to that data of the at least one sensitivity model is incomplete.

16. The computer program product of claim 11, wherein the optimizing program code prioritizes a testing of the device for sensitivities.

17. The computer program product of claim 11, wherein the sensitivity data is received through a messaging system from at least one of the assembly unit and a testing unit.

18. An optimizer system comprising:
a model analyzer for receiving sensitivity data for a device of an assembly unit, and analyzing the sensitivity data during operation of the assembly unit on a floor schedule; and
a scheduling optimizer for optimizing the floor schedule of the assembly unit based on the analyzed sensitivity data.

19. The optimizer system of claim 18, further comprising a testing unit for generating sensitivity data for the device.

20. The optimizer system of claim 19, wherein the sensitivity data is received through a messaging system from at least one of the assembly unit and the testing unit.

21. The optimizer system of claim 20, wherein the testing unit further comprises a sensitivity monitor for generating sensitivity data; a reliability generator for generating reliability data having rules for the device and assembly unit; and a tool controller for invoking the sensitivity monitor and reliability generator and shutting down a testing tool of the testing unit.

22. The optimizer system of claim 20, wherein the sensitivity data is generated through at least one sensitivity model.

23. The optimizer system of claim 22, wherein the sensitivity model includes at least one of a human body model, a machine model, a charged device model, a transmission line pulse model, and a very fast transmission line pulse model.

24. The optimizer system of claim 21, wherein the scheduling optimizer further comprises: an automated material handling system dispatcher for optimizing the floor schedule in real-time based on the sensitivity data and the reliability data; and a maintenance scheduler for scheduling maintenance based on the sensitivity data and the reliability data.

25. A method comprising the steps of:
generating sensitivity data for a device of an assembly unit during operation of the assembly unit on a floor schedule; and
receiving an optimal path data of the floor schedule that is generated based on the sensitivity data,
wherein the optimal path data controls the path of the device through the assembly unit.

26. The method of claim 25, further comprising the steps of generating the sensitivity data and receiving the optimal path data in real-time.

27. The method of claim 25, wherein the sensitivity data includes at least one of electrostatic discharge sensitivity data, electrical overstress sensitivity data, latch-up data, hot electron data, mobile ion contamination data, and negative bias threshold instability data.

28. The method of claim 25, wherein the sensitivity data is transmitted through a messaging system.

29. The method of claim 25, wherein the generating step further comprises the step of generating at least one sensitivity model with the sensitivity data.

30. The method of claim 29, wherein the sensitivity model includes at least one of a human body model, a machine model, a charged device model, a transmission line pulse model, and a very fast transmission line pulse model.

31. A testing unit comprising:
a sensitivity monitor for generating sensitivity data for a device;
a reliability generator for generating reliability data having rules for the device; and
a tool controller for invoking the sensitivity monitor and reliability generator and shutting down a testing tool of the testing unit.

32. The testing unit of claim 31, further comprising a messaging system for transmitting the sensitivity data and reliability data in real-time.

33. The testing unit of claim 31, wherein at least one sensitivity model is generated with the sensitivity data.

34. The testing unit of claim 33, wherein the sensitivity model includes at least one of a human body model, a machine model, a charged device model, a transmission line pulse model, and a very fast transmission line pulse model.

* * * * *